No. 783,232. PATENTED FEB. 21, 1905.
J. W. TRULOVE.
SPECTACLES.
APPLICATION FILED NOV. 2, 1904.

Witnesses
Sidney P. Hollingsworth
C. D. Davis

Inventor
James W. Trulove
By R. W. Bishop
Attorney.

No. 783,232. Patented February 21, 1905.

UNITED STATES PATENT OFFICE.

JAMES WILLIAM TRULOVE, OF MEMPHIS, TEXAS.

SPECTACLES.

SPECIFICATION forming part of Letters Patent No. 783,232, dated February 21, 1905.

Application filed November 2, 1904. Serial No. 231,095.

*To all whom it may concern:*

Be it known that I, JAMES WILLIAM TRULOVE, a citizen of the United States of America, residing at Memphis, in the county of Hall and State of Texas, have invented certain new and useful Improvements in Spectacles, of which the following is such a full, clear, and exact description as will enable others skilled in the art to which it appertains to make and use the same, reference being had to the accompanying drawings, forming a part hereof.

This invention relates to spectacles, and has special reference to the bridge, the object of the invention being to provide a construction which will permit the ready adjustment of the bridge to the form of the nose in order to bring the lenses of the spectacles properly before the eyes. This object is attained by the use of the device illustrated in the accompanying drawings; and the invention consists in certain novel features of the same, as will be hereinafter first fully described and then particularly pointed out in the claim.

Figure 1:
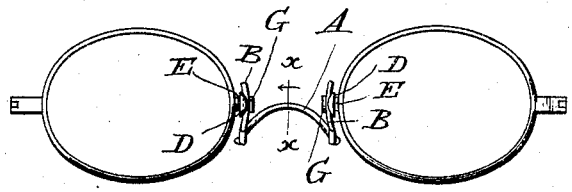
Figure 2:
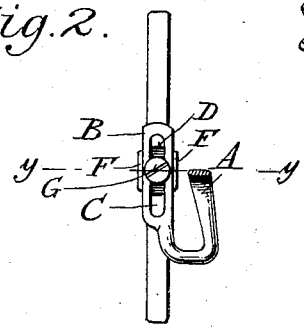
Figure 3:
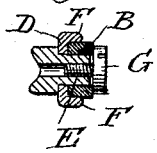
Figure 4:
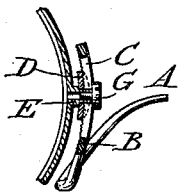
Figure 5:
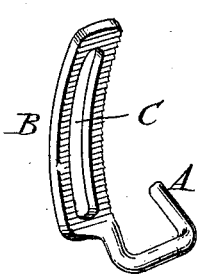
Figure 6:
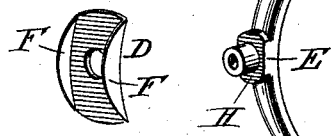
Figure 7:
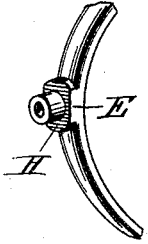

In the drawings, Figure 1 is a front elevation of a pair of spectacles having its bridge constructed in accordance with my invention. Fig. 2 is a view taken on the line $x\,x$ of Fig. 1. Fig. 3 is a horizontal section taken on the line $y\,y$ of Fig. 2. Fig. 4 is a vertical section taken centrally through Fig. 2. Fig. 5 is a detail perspective view of one end of the bridge. Fig. 6 is a similar view of the washer, and Fig. 7 is a similar view of the post.

The spectacle-lenses may be mounted in frames or may be provided with the rimless fittings of the usual variety. In the practice of my invention the bridge A is provided with elongated end plates B, having longitudinal slots C, and shaped on arcs corresponding to the curvature of the lenses or frame, so as to fit neatly against the same. A washer D is fitted over the post E on the lens-mounting, and the edges of this washer are turned up to form flanges F, between which the end plate of the bridge is received, the post projecting through the washer and into the slot of the said end plate. A securing-screw G is inserted through the slot C and caused to engage the internally-threaded bore of the post, the head of the said screw projecting over the walls of the slot, so as to bear upon the end plate and bind the same and the washer firmly against the base of the post. The base of the post is provided with a plurality of serrations or small grooves, as shown at H, and similar serrations or grooves are provided on the outer face of the end plate on the bridge, while both faces of the washer are constructed with such faces of the washer are constructed with such serrations or grooves, the result being that when the securing-screw is turned home the several serrated faces will engage so as to hold the parts against lateral movement as firmly as though they were soldered together.

So far as I am aware the bridges of spectacles have always heretofore been constructed as an integral or rigid part of the frame or lens-mounting. Inasmuch, however, as all noses are not of the same shape and size, it has been necessary to depend upon the temples entirely to hold the spectacles, and the bridge frequently rested on the nose at such a point as to be very uncomfortable and also hold the lenses in an improper position before the eyes. In the spectacles provided with my improvement the spectacles are placed in front of the eyes of the customer with the screw loose, and the bridge is then shifted upon the post until the lens and bridge are brought into the proper relative positions for the bridge to rest easily and comfortably on the nose and the lens to be held directly in front of the eye. After the proper adjustment has been obtained the securing-screws are turned home to secure the parts firmly together, as will be readily understood. The interposition of the flanged washer and the serrated faces on the abutting parts permits an adjustment of the bridge to any desired angle without requiring any bending of any part. The desired adjustment may be readily effected, and one lens may be adjusted to a higher point than the other to fit irregular eyes. The device is simple in construction, and its advantages are thought to be obvious.

Having thus described my invention, what I claim, and desire to secure by Letters Patent, is—

The combination of the post having a notched or serrated base, a washer fitted over the post and against the serrated base thereof and having flanges on its inner face, the inner and outer faces of the washer both being notched or serrated, the bridge having a vertical longitudinally-slotted end fitted over the post and between the flanges of the washer, the outer face of the said vertical slotted end being serrated, and a screw inserted into the end of the post with its head bearing against the inner face of the vertical slotted end of the bridge.

In testimony whereof I have signed this specification in the presence of two subscribing witnesses.

JAMES WILLIAM TRULOVE.

Witnesses:
 JAMES M. BALLEW,
 ROBT. A. DUNBAR.